(12) United States Patent
Imai et al.

(10) Patent No.: US 10,068,603 B2
(45) Date of Patent: Sep. 4, 2018

(54) MAGNETIC RECORDING MEDIUM

(75) Inventors: Kunihiro Imai, Nagano (JP); Takako Matsumoto, Nagano (JP); Takeshi Watanabe, Nagano (JP); Akira Furuta, Nagano (JP); Kazuhiro Kusakawa, Yamanashi (JP); Masami Kuroda, Kanagawa (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 1090 days.

(21) Appl. No.: 12/733,420

(22) PCT Filed: Sep. 12, 2008

(86) PCT No.: PCT/JP2008/066531
§ 371 (c)(1),
(2), (4) Date: May 26, 2010

(87) PCT Pub. No.: WO2009/035075
PCT Pub. Date: Mar. 19, 2009

(65) Prior Publication Data
US 2010/0233513 A1    Sep. 16, 2010

(30) Foreign Application Priority Data

Sep. 14, 2007 (JP) ................. 2007-239490
Sep. 14, 2007 (JP) ................. 2007-239491

(51) Int. Cl.
*G11B 5/65* (2006.01)
*G11B 5/84* (2006.01)
(Continued)

(52) U.S. Cl.
CPC ......... *G11B 5/8408* (2013.01); *C10M 107/38* (2013.01); *G11B 5/725* (2013.01);
(Continued)

(58) Field of Classification Search
CPC .......... C10M 107/38; C10M 2211/042; C10M 2213/043; C10N 2220/021;
(Continued)

(56) References Cited

U.S. PATENT DOCUMENTS 5,536,425 A * 7/1996 Kondo et al. .......... 252/62.51 R
5,959,058 A   9/1999 Tonelli et al.
(Continued)

FOREIGN PATENT DOCUMENTS

JP   5-247200 A    9/1993
JP   10-143838 A   5/1998
(Continued)

*Primary Examiner* — Holly Rickman
*Assistant Examiner* — Linda Chau
(74) *Attorney, Agent, or Firm* — Rabin & Berdo, P.C.

(57) ABSTRACT

A magnetic recording medium includes a nonmagnetic substrate and at least a magnetic layer, a protective layer, and a lubricating layer provided on the nonmagnetic substrate. The magnetic recording medium is characterized in that the lubricating layer is formed of a lubricating agent represented by general formulas (1), (2) or (3), in which substituents $R_1$, $R_2$, $R_3$, and $R_4$ in the lubricating agent represent organic groups, at least one of the substituents $R_1$ and $R_2$ at the end part of the lubricating agent and the substituents $R_3$ and $R_4$ contain a plurality of functional groups, and the shortest distance between the functional groups is a distance of three or more atoms, preferably five atoms. The magnetic recording medium may be used for a heat assisted recording method in which the temperature of the magnetic layer reaches 150° C. to 200° C. The magnetic recording medium is characterized in that the amount of the lubricating agent volatilized in the lubricating layer is less than 10% of the initial layer thickness.

8 Claims, 2 Drawing Sheets (51) Int. Cl.
*C10M 107/38* (2006.01)
*G11B 5/725* (2006.01)

(52) U.S. Cl.
CPC . *C10M 2211/042* (2013.01); *C10M 2213/043* (2013.01); *C10N 2220/021* (2013.01); *C10N 2230/08* (2013.01); *C10N 2240/204* (2013.01); *C10N 2250/121* (2013.01); *C10N 2250/14* (2013.01)

(58) Field of Classification Search
CPC .......... C10N 2230/08; C10N 2240/204; C10N 2250/121; C10N 2250/14; G11B 5/725; G11B 5/8408
See application file for complete search history.

(56) References Cited

U.S. PATENT DOCUMENTS

| | | | |
|---|---|---|---|
| 2003/0138670 A1* | 7/2003 | Liu et al. | 428/695 |
| 2005/0170136 A1* | 8/2005 | Shimokawa et al. | 428/65.4 |
| 2005/0277558 A1* | 12/2005 | Deng et al. | 508/548 |
| 2006/0177705 A1* | 8/2006 | Ahner et al. | 428/832 |
| 2007/0060487 A1* | 3/2007 | Burns et al. | 508/582 |
| 2007/0225183 A1* | 9/2007 | Sasa et al. | 508/582 |

FOREIGN PATENT DOCUMENTS

| | | | |
|---|---|---|---|
| JP | 2003-045004 A | 2/2003 |
| JP | 2004-152460 A | 5/2004 |
| JP | 2004-253110 A | 9/2004 |
| JP | 2006-012249 A | 1/2006 |
| JP | 2006-328418 A | 12/2006 |

\* cited by examiner

MAGNETIC RECORDING MEDIUM

CROSS REFERENCE TO RELATED APPLICATIONS

This application is the national phase of international application number PCT/JP2008/066531, filed Sep. 12, 2008, and claims the benefit of priority of Japanese applications 2007-239490 and 2007-239491, both filed Sep. 14, 2007. The disclosures of the international application and the Japanese priority applications are incorporated herein by reference.

BACKGROUND OF THE INVENTION

The present invention relates to a magnetic recording medium, and in particular relates to a magnetic recording medium used as a computer external storage device or the like.

Lubricants have been developed for magnetic recording media, and in particular for magnetic disks, with the purpose of reducing the friction force occurring between the protective layer and the head, and improving durability and reliability.

For example, in order to improve the lubricating characteristics on the surface layer of a magnetic recording medium, perfluoro polyether lubricants having hydroxyl groups or other polar terminal groups or cyclotriphosphazene terminal groups in the molecule are applied onto a diamond-like carbon (DLC) protective layer.

On the surface of a diamond-like carbon (DLC) protective layer, there exist numerous carboxyl groups, hydroxyl groups, amine groups, and other functional groups; terminal groups of the lubricant are actively adsorbed onto or bond with these functional groups.

However, these functional groups have characteristics such that there is active adsorption of water, acidic gases, and other contaminants, in addition to the terminal groups of a lubricant. Hence when there exist residual groups not bonded to lubricant terminal groups on the surface of the protective layer, there is the concern that the amount of adsorbed contaminants may be increased.

Hence in order to suppress adsorption of water, acidic gases, and other contaminants onto the disk medium surface, it is necessary to raise the bonding amount (bonding fraction) of functional groups existing on the carbon surface with the lubricant (see Patent Reference 1 and Patent Reference 2, identified below).

In addition, in recent years there have been urgent demands for higher recording densities, and a need has arisen for a magnetic recording medium having areal densities exceeding 1 Tbits/in$^2$. To achieve this, the particle sizes in the magnetic layer must be reduced and noise must be decreased. However, if particle sizes are made too small, there is the problem that magnetic signals recorded in the magnetic layer are annihilated through thermal demagnetization. Hence in order to raise recording densities, magnetic layers having high thermal stability and a high coercivity must be used.

Hence methods have been proposed in which the region for recording of a magnetic recording medium having a high-coercivity recording layer is heated, for example, by irradiation with laser light to lower the coercivity, and a magnetic head is used to apply a magnetic field according to the information in the region with lowered coercivity, to record the information (see Patent Reference 3 and Patent Reference 4). The above recording method is called thermally assisted magnetic recording.

In the thermally assisted magnetic recording method, by irradiating the recording surface with laser light, the recording layer is heated to approximately 150° C. to 200° C. Hence the above-described lubricant is exposed to high temperatures due to thermal conduction from the recording layer.

However, lubricants of the prior art are not considered for use in the high-temperature environments anticipated in thermally assisted magnetic recording, and there are concerns that in the high-temperature environment described above, the lubricant may be reduced due to volatility.

Patent Reference 1: Japanese Patent Application Laid-open No. H5-247200
Patent Reference 2: Japanese Patent Application Laid-open No. 2004-253110
Patent Reference 3: Japanese Patent Application Laid-open No. 2003-45004
Patent Reference 4: Japanese Patent Laid-open No. 2006-12249
Patent Reference 5: Japanese Patent No. 3223238
Patent Reference 6: U.S. Pat. No. 5,959,058.

SUMMARY OF THE INVENTION

An object of this invention is to provide a magnetic recording medium having high adsorptivity between the lubricant and the surface of the diamond-like carbon (DLC) protective layer, compared with a medium of the prior art. A further object of this invention is to provide a magnetic recording medium which alleviates problems relating to thermal resistance of the above-described lubricant, and which has high thermal resistance.

A magnetic recording medium of this invention is a magnetic recording medium formed of at least a magnetic layer, a protective layer, and a lubricant layer provided on a nonmagnetic substrate, and is characterized in that: a lubricant forming the lubricant layer is a lubricant represented by following general formula (1), (2), or (3); substituents $R_1$, $R_2$, $R_3$, and $R_4$ of terminal portions of the lubricant are organic groups; at least one of the substituents $R_1$ and $R_2$ as well as the substituents $R_3$ and $R_4$ have a plurality of functional groups; the shortest distance between the functional groups is three atoms or more, and is preferably five atoms.

(where, p and q are mutually independent positive integers.)

(where, r is a positive integer.)

(where, s is a positive integer.)

In this invention, it is preferable that the plurality of functional groups of the substituents of the lubricant be the same or be different, and be selected from among hydroxy groups, carboxyl groups, aldehyde groups, primary and secondary amine groups, nitro groups, nitrile groups, isonitrile groups, isocyanato groups, thiol groups, sulfo groups, phosphate groups, phosphite groups, primary and secondary phosphine groups, and heterocyclic groups.

It is preferable that the substituents $R_1$, $R_2$, $R_3$, and $R_4$ be selected from among aliphatic hydrocarbons or fluoride derivatives thereof or aromatic hydrocarbons or fluoride derivatives thereof (these may comprise one or more ether oxygen atoms and/or tertiary amine nitrogen atoms), whose structure between the plurality of functional groups is saturated or unsaturated, or from combinations among these.

The magnetic recording medium of this invention is a magnetic recording medium used in a thermally assisted recording method with magnetic layer temperatures between 150° C. and 200° C., and is characterized by being formed of at least a magnetic layer, a protective layer, and a lubricant layer provided on a nonmagnetic substrate, an amount of volatilization of the lubricant of the lubricant layer being less than 10% of an initial film thickness. It is preferable that the initial film thickness of the lubricant layer be 1.2 nm or less.

In this invention, it is preferable that the lubricant forming the lubricant layer be a lubricant represented by the above general formula (1), (2), or (3).

By applying a lubricant of this invention onto a diamond-like carbon (DLC) protective layer, a magnetic recording medium can be provided having enhanced bonding properties between the lubricant and the surface of the diamond-like carbon (DLC) protective layer, compared with the prior art.

By using the magnetic recording medium of this invention, when employing thermally assisted recording methods with magnetic layer temperatures of 150° C. to 200° C., a magnetic recording medium with suppressed amounts of lubricant volatilization and having high thermal resistance characteristics compared with the prior art can be provided.

DESCRIPTION OF THE PREFERRED EMBODIMENT

A first embodiment of the invention relates to a magnetic recording medium onto which a specific lubricant for a magnetic recording medium is applied.

In general, after applying a lubricant onto a carbon surface, heat treatment can be performed to raise the bonding fraction between the functional groups on the carbon surface and the terminal groups of the lubricant. The higher the heat treatment temperature, the more an increased bonding fraction between the two is promoted. However, there is a limit to raising the bonding fraction between functional groups existing on the carbon surface and the lubricant terminal groups. Specifically, in cases in the prior art in which a perfluoro polyether lubricant is used having hydroxyl groups and other polar terminal groups in molecules, as well as cyclotriphosphazene terminal groups, when the heating temperature exceeds 100° C., a phenomenon called "heating loss" in which lubricant is volatilized from the disk surface becomes prominent, and this phenomenon grows as the temperature is raised. Hence when performing treatment at high temperatures, the amount of lubricant existing on the disk surface decreases markedly compared with before heat treatment. Hence constraints exist when increasing the bonding fraction through heat treatment.

In general, the bonding fraction between functional groups existing on a carbon surface and lubricant terminal groups is expressed as the ratio of the lubricant film thickness after cleaning with a fluoride solvent to the lubricant film thickness before cleaning with the fluoride solvent; the percentage value is called the "bond ratio".

Bond ratio (%)=(lubricant layer film thickness after cleaning)/(lubricant layer film thickness before cleaning)×100

Here, the lubricant layer film thickness before cleaning is called the "total lubricant film thickness", and the lubricant layer film thickness after cleaning is called the "bonded lubricant film thickness"; the difference between the total lubricant film thickness and the bonded lubricant film thickness is called the "free lubricant film thickness". The "bonded lubricant film thickness" is the thickness (amount) of lubricant actually bonded with the surface of the carbon layer; this amount must be increased in order to suppress contaminants. In this Specification, the term "initial film thickness amount" is used with the same meaning as "total lubricant film thickness".

As a perfluoro polyether lubricant to improve this bond ratio, Fomblin Z-Tetraol (manufactured by Solvay Solexis) has been developed, and has been applied to media (Patent Reference 5). After application by the immersion method, the bond ratio of Fomblin Z-Tetraol rises upon performing heat curing, but the upper limit to the bond ratio is approximately 70%. At this time, for the total lubricant film thicknesses of 1.0, 1.2, and 1.4 nm of normal hard disk lubricants, the bonded lubricant film thicknesses are respectively 0.7, 0.84, and 0.98 nm.

On the other hand, the tendency toward higher magnetic disk densities of recent years has been accompanied by stricter demands made on lubricant characteristics. In order to accommodate these demands, hereafter it will be necessary to further raise the upper limit to bonded lubricant film thicknesses.

In addition, there have been an increasing number of cases in which the hard disk drives of recent years have come to be used not only in personal computers used indoors, as in the past, but in portable equipment, car navigation systems, and other outdoor environments as well. In particular, in high-temperature, high-humidity environments, there exists a phenomenon in which the magnetic head slider does not fly readily; this is attributed to a phenomenon of aggregation of water contained in the high-humidity air. For this reason, reduction of the amount of water aggregated on the surface of the magnetic disk, that is, rendering the disk surface hydrophobic, is a major challenge.

An increase in the bonded lubricant film thickness is necessary for this rendering hydrophobic, but when an upper limit to the bond ratio is stipulated, the amount may be increased by simply increasing the total lubricant film thickness. However, when the film thickness is simply increased, a phenomenon in which lubricant is picked up onto the flying slider tends to occur, and there are concerns that unstable slider flight may result.

Hence instead of the method of increasing the total lubricant film thickness, a method of raising the bonding fraction between the lubricant and the carbon surface compared with methods of the prior art is deemed necessary.

The magnetic recording medium of this invention comprises, at least, a magnetic layer, protective layer, and lubricant layer provided on a nonmagnetic substrate, and is characterized in using a lubricant layer of a lubricant explained below.

Further, the magnetic recording medium of this invention can be used in thermally assisted magnetic recording methods. This magnetic recording medium comprises, at least, a magnetic layer, protective layer, and lubricant layer provided on a nonmagnetic substrate, and when used in a thermally assisted recording method in which the magnetic layer temperature is between 150° C. and 200° C., the amount of volatilization of lubricant of the lubricant layer is less than 10% of the initial film thickness. The magnetic recording medium of this invention is optimal for use in such thermally assisted recording methods. Thus this invention is characterized in that a lubricant, capable of suppressing the amount of volatilization of lubricant to less than 10% of the initial film thickness under the temperature of 150° C. to 200° C. of the magnetic layer, is used in the lubricant layer. So long as the above conditions are satisfied by the lubricant for the magnetic recording medium, no limitations in particular are placed on the lubricant; however, in this invention it is preferable that a lubricant such as explained below be used in the lubricant layer.

A lubricant used in this invention is a lubricant represented by the following general formula (1), (2), or (3). This lubricant has substituents $R_1$, $R_2$, $R_3$, and $R_4$ in the terminal portions; the substituents are organic groups, and at least one among the substituents $R_1$ and $R_2$ of the terminal portions as well as the substituents $R_3$ and $R_4$ have a plurality of functional groups. The shortest distance between the functional groups is three atoms or more, including the atoms bonded to the functional groups, and is preferably five atoms. Further, it is preferable that the molecular weight of the lubricant be between 500 and 10,000.

$$R_1\text{—}(CF_2CF_2O)_p\text{—}(CF_2O)_q\text{—}R_2 \quad (1)$$

(where, p and q are mutually independent positive integers.)

$$F\text{—}(CF_2CF_2CF_2O)_r\text{—}R_3 \quad (2)$$

(where, r is a positive integer.)

$$F\text{—}(CFCF_2O)_s\text{—}CFR_4 \quad (3)$$
$$\phantom{F\text{—}(}|\phantom{CFCF_2O)_s\text{—}}|$$
$$\phantom{F\text{—}(}CF_3\phantom{CF_2O)_s\text{—}}CF_3$$

(where, s is a positive integer.)

It is preferable that the plurality of functional groups comprised by each of the substituents be selected from among hydroxy groups, carboxyl groups, aldehyde groups, primary and secondary amine groups, nitro groups, nitrile groups, isonitrile groups, isocyanato groups, thiol groups, sulfo groups, phosphate groups, phosphite groups, primary and secondary phosphine groups, and heterocyclic groups. Moreover, the plurality of functional groups may be the same, or may be different.

The substituents $R_1$, $R_2$, $R_3$, and $R_4$ are organic groups with from three to twelve carbon atoms, and are substitution or non-substitution straight-chain or branched aliphatic hydrocarbons, or substitution or non-substitution aromatic hydrocarbons. It is preferable that the organic groups be selected from among aliphatic hydrocarbons or fluoride derivatives thereof or aromatic hydrocarbons or fluoride derivatives thereof, the structure between the plurality of functional groups thereof of which is saturated or unsaturated, or from combinations among these. The saturated or unsaturated aliphatic hydrocarbons or fluoride derivatives thereof, and the aromatic hydrocarbons or fluoride derivatives thereof, may comprise one or more ether oxygen atoms or tertiary amine nitrogen atoms; when a plurality of ether oxygen atoms or tertiary amine nitrogen atoms are comprised, a combination of these may be comprised.

Because lubricant used in this invention has a molecular structure such as that indicated by the general formula (1), (2) or (3), compared with Z-Tetraol of the prior art, functional groups within terminal substituents are mutually separated, and the intramolecular interaction between functional groups is weakened. Hence the interaction between the carboxyl groups, hydroxyl groups, amine groups, and other functional groups which exist in large numbers on the surface of the protective layer, and the functional groups within the lubricant terminal groups, is relatively strengthened, and bonding properties with the protective layer are increased. As a result, by applying the above-described lubricant onto the surface of the magnetic recording medium, the bond ratio can be increased compared with the prior art. Further, by applying the above-described lubricant onto the surface of the magnetic recording medium, the phenomenon of lubricant volatilization at high temperatures can be suppressed compared with the prior art, and a magnetic recording medium having high thermal resistance can be realized.

Figure 1:
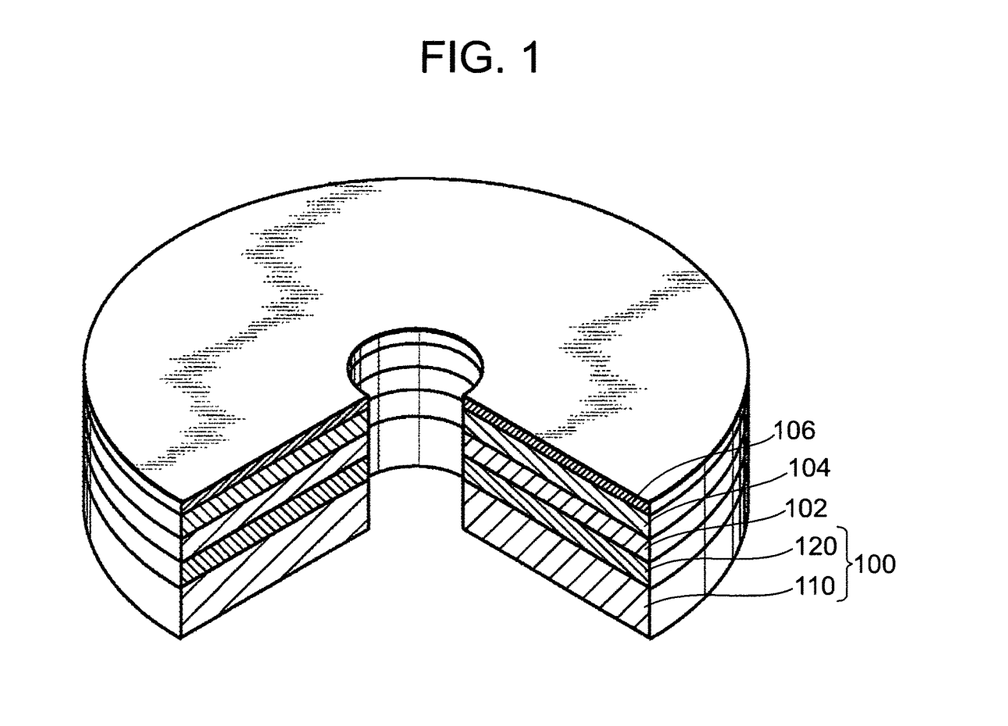
FIG. 1 is a perspective view showing an example of the layer structure of a magnetic recording medium of this invention.

Next, the magnetic recording medium of this invention is explained. The magnetic recording medium of this invention comprises, at least, a magnetic recording layer, protective layer, and lubricant layer on a nonmagnetic substrate. One example is the structure shown in FIG. 1. That is, on the nonmagnetic substrate 100 are provided a magnetic layer 102, protective layer 104, and lubricant layer 106.

No limitations in particular are placed on the nonmagnetic substrate, so long as the substrate has been used in conventional magnetic recording media. For example, the substrate shown in FIG. 1 may be a base 110 of aluminum alloy or similar, such as is widely used in the prior art, on which an Ni—P or other nonmagnetic metal layer (plated layer) 120 is formed by electroless plating, or may instead comprise glass, ceramics, plastics, or other materials.

In the magnetic recording medium of this invention, a nonmagnetic underlayer, soft magnetic layer, seed layer, intermediate layer, or similar may be provided as necessary between the nonmagnetic substrate and the magnetic layer.

A nonmagnetic underlayer which may optionally and selectively be provided can be formed comprising Ta, Ti, or a nonmagnetic material comprising Cr such as a CrTi alloy.

A soft magnetic layer which may optionally and selectively be provided can be formed using crystalline material such as FeTaC, Sendust (FeSiAl) alloy, or similar; microcrystalline material such as FeTaC, CoFeNi, CoNiP, or similar; or amorphous material comprising a Co alloy, such as CoZrNd, CoZrNb, CoTaZr, or similar. The soft magnetic layer is a layer used to concentrate the perpendicular-direction magnetic field of the magnetic layer, and so while the optimum value for the film thickness changes depending on the structure and characteristics of the magnetic head used for recording, taking productivity into consideration, a value of approximately 10 nm or greater and 500 nm or less is desirable.

A seed layer which may optionally and selectively be provided can be formed using a metal or alloy having the face-centered cubic lattice structure, or using Ta or a Ta alloy. As metals or alloys having the face-centered cubic lattice structure, Cu, Pd, Pt, Ni, or an alloy comprising one or more of these; NiFe, NiFeSi, NiFeNb, NiFeB, NiFeCr, or a similar Permalloy system material; CoNiFe, CoNiFeSi, CoNiFeB, CoNiFeNb, CoNiFeCr, or a similar Permalloy system alloy with Co further added; Co; or CoB, CoSi, CoNi, CoFe, or another Co-base alloy, can be used in formation. It is desirable that the seed layer have sufficient film thickness to control the crystal structure of the magnetic layer; in normal cases, a film thickness of 3 nm or greater and 50 nm or less is desirable.

An intermediate layer which may optionally and selectively be provided can be formed using Ru or an alloy the main component of which is Ru, or Co or an alloy the main component of which is Co. Moreover, these metals or alloys may be layered and used. An intermediate layer normally has a film thickness of 0.1 nm or greater and 30 nm or less. By making the film thickness in this range, the magnetic layer can be imparted with characteristics necessary for high-density recording, without causing degradation of the magnetic characteristics or electromagnetic transducing characteristics of the magnetic layer.

The above-described underlayer, soft magnetic layer, seed layer, and intermediate layer can be formed by a sputtering method (DC magnetron sputtering, RF magnetron sputtering, or similar), by a vacuum evaporation method, or using any other arbitrary method known in the art.

The magnetic layer can appropriately be formed using a ferromagnetic material which is an alloy comprising at least Co and Pt. In order to perform perpendicular magnetic recording, the easy axis of magnetization of the magnetic layer material (the c axis in a hexagonal close-packed (hcp) structure) must be oriented in the direction perpendicular to the recording medium surface (that is, the principal surface of the magnetic recording medium substrate). The magnetic layer can be formed using an alloy material such as, for example, CoPt, CoCrPt, CoCrPtB, CoCrPtTa, or similar. No limitations in particular are placed on the film thickness of the magnetic layer. However, from the standpoint of productivity and improving recording densities, it is preferable that the magnetic layer have a film thickness of 30 nm or less, more preferably 15 nm or less, still more preferably from 5 nm to 30 nm, and most preferably from 5 nm to 15 nm. The magnetic layer can be formed using a sputtering method (DC magnetron sputtering, RF magnetron sputtering, or similar), by a vacuum evaporation method, or using any other arbitrary method known in the art.

As an alternative method, the magnetic layer may be formed using material having a granular structure, in which magnetic crystal grains are dispersed in a nonmagnetic oxide or a nonmagnetic nitride matrix. Materials having a granular structure which can be used include, but are not limited to, CoPt—SiO$_2$, CoCrPtO, CoCrPt—TiO$_2$, CoCrPt—SiO$_2$, CoCrPt—Al$_2$O$_3$, CoPt—AlN, CoCrPt—Si$_3$N$_4$, and similar. When using a material having a granular structure, magnetic separation between magnetic crystal grains in proximity in the magnetic layer is promoted, so that improvement of magnetic recording characteristics, such as noise reduction, SNR improvement, and recording resolution improvement, are possible.

The protective layer can be formed using carbon (diamond-like carbon (DLC), amorphous carbon, or similar), or various thin film materials known as materials for the protective layer of a magnetic recording medium. The protective layer is a layer which protects the magnetic layer therebelow and each of the constituent layers therebelow. When using the magnetic recording medium of this invention as a magnetic recording medium having high thermal resistance, it is preferable that the protective layer be diamond-like carbon. The protective layer can generally be formed using a sputtering method (DC magnetron sputtering, RF magnetron sputtering, or similar), vacuum evaporation method, CVD method, or similar.

The lubricant layer is a layer used to impart lubrication when a record/read head is in contact with the magnetic recording layer, and can be formed using the above-described lubricants. The lubricant layer can be formed using a dip coating method, spin coating method, or other arbitrary application method known in the art.

Working Example

Below, a Working Example of the invention is explained in detail; however, the following Working Example is an illustrative example, and is not intended to limit the scope of the invention.

A lubricant of a compound (A) having the structure shown below was prepared and was applied to the magnetic recording medium, and the characteristics of the magnetic recording medium were evaluated.

Compound (A)

1. Method of Synthesis of Lubricant (Compound (A))

A solution comprising Fomblin-Z-DOL2000 (100 g), potassium tert-butoxide (23.95 g), and tert-butanol (150 ml) was prepared according to a method described in U.S. Pat. No. 5,959,058 (Patent Reference 6), and this was dripped over four hours into a solution comprising epibromohydrin (100 g) and tert-butanol (100 g) heated up to 70° C., and was then held at the same temperature for one more hour.

After the end of the reaction, the precipitate was separated by filtering, concentrated, and heated at 80° C., to obtain, as a yellow oil, a fluorine-containing oligomer diglycidyl ether (93 g) precursor.

The precursor (weight-average molecular weight (Mw) =2.4×10$^3$, 70.0 g), ethylene glycol (100 g), and triphenyl phosphine (0.7 g) were placed into a pear-shaped 1000 ml flask comprising a stirrer, and a reaction was driven for 46 hours at 180° C. while stirring.

After the end of the reaction, cooling to room temperature was performed, followed by separation, and after cleaning with 50 g of ethylene glycol, filtration and concentration were performed to obtain a product (72.3 g). The product was analyzed, and the results shown below were obtained. From these results it was confirmed that the product was a lubricant of the desired compound (A).

$^1$H-NMR (400 MHz, C$_6$F$_6$) σ 3.30 to 5.00 (m, 11H)

$^{19}$F-NMR (376 MHz, C$_6$F$_6$) σ −91.80, −90.14, −82.00, −80.00, −56.56, −54.83, −53.23

GPC: weight-average molecular weight (Mw)=5.2×10$^3$, number-average molecular weight (Mn)=1.9×10$^3$, Mw/Mn=2.8

The following apparatus was used to perform analyses.

$^1$H-NMR, $^{19}$F-NMR: AVANCE II 400 manufactured by BRUKER

Molecular weight distribution (GPC): apparatus; HLC8120GPC manufactured by Tosoh Corp., columns; TSKgel super AW (6.0 mm ID×150 mm L, two columns) manufactured by Tosoh Corp., detector; RI8020 (differential refractometer), solvent; 1,1,1,3,3,3-hexafluoro-2-propanol, flow rate; 0.6 ml/min, sample injection amount; 20 μL (concentration 1 mg/ml), system/column temperature; 40° C., calibration; standard PMMA 2. Fabrication of a Magnetic Recording Medium (Sample)

A sputtering method was used to form, in order on a nonmagnetic substrate (a 95 mm diameter substrate for magnetic disks comprising an Al alloy material), an underlayer comprising CrTi of film thickness 2 nm, a soft magnetic layer comprising CoZrNb of film thickness 50 nm, a seed layer comprising CoNiFeSi of film thickness 5 nm, an intermediate layer comprising Ru of film thickness 10 nm, and a magnetic layer comprising CoCrPt—SiO$_2$ and CoCrPrB of film thickness 16 nm.

Next, a plasma CVD method was used to form an amorphous carbon protective layer of film thickness 3.5 nm. Onto the magnetic disk substrate covered with this protective layer, a lubricant solution of the compound (A) synthesized by the synthesis method described above was applied by dipping. Specifically, the disk substrate was immersed (for 60 seconds when the film thickness was 0.8 nm, for 480 seconds when the film thickness was 1.2 nm) in a lubricant solution using Vertrel XF as a solvent (concentration: 50 ppm when the film thickness was 0.8 nm, 100 ppm when the film thickness was 1.2 nm), the magnetic disk was lifted at a velocity of 2.0 mm/sec, and was then dried at room temperature, 22° C.

For comparison, a Z-tetraol (manufactured by Solvay Solexis) used in the prior art was also applied, under conditions such that the applied film thickness was equal to that of the above Working Example. Specifically, the disk substrate was immersed (for 60 seconds) in a lubricant solution using Vertrel XF as a solvent (concentration: 120 ppm when the film thickness was 0.8 nm, 500 ppm when the film thickness was 1.2 nm), the magnetic disk was lifted at a velocity of 0.5 mm/sec when the film thickness was 0.8 nm and at 1.5 mm/sec when the film thickness was 1.2 nm, and was then dried at room temperature, 22° C.

3. Evaluation of a Magnetic Recording Medium 3-1. Bond Ratio

Samples fabricated by the above method were subjected to measurements of the film thickness of the lubricant layer before cleaning and after cleaning, and the bond ratio was calculated. Results appear in Table 1. The film thickness of the lubricant layer was measured using a Fourier transform infrared spectrometer (FT-IR).

TABLE 1

| Lubricant | | Total lubricant film thickness (nm) | Bonded lubricant film thickness (nm) | Bond ratio (%) |
| --- | --- | --- | --- | --- |
| Comparative Example 1 | Z-tetraol | 0.84 | 0.35 | 41 |
| Working Example 1 | compound (A) | 0.80 | 0.60 | 74 |
| Comparative Example 2 | Z-tetraol | 1.16 | 0.38 | 31 |
| Working Example 2 | compound (A) | 1.21 | 0.93 | 77 |

From Table 1, it is seen that when the application process has ended, a bonded lubricant film thickness greater than for a lubricant of the prior art is obtained. For example, when comparing Comparative Example 1 and Working Example 1, for which the total lubricant film thickness is substantially the same 0.8 nm, the bonded lubricant film thickness is greater by 1.8 times for Working Example 1, using the compound (A), than for Comparative Example 1, using the conventional lubricant. Similarly, when comparing Comparative Example 2 and Working Example 2 as well, with a total lubricant film thickness of 1.2 nm, the bonded lubricant film thickness is greater by 2.4 times for Working Example 2 using compound (A) than for Comparative Example 2 using the conventional lubricant, and so a large difference can be seen between the bond ratio of the magnetic recording medium of this invention and that of the prior art.

The "total lubricant film thickness", "bonded lubricant film thickness", and "bond ratio" shown in Table 1 are as explained above.

Further, as the fluoride solvent for cleaning of the lubricant, generally Vertrel XF (manufactured by DU PONT-MITSUI FLUOROCHEMICALS COMPANY, LTD.) is used, and in these evaluations also this solvent was used. Cleaning was performed by the method of dipping each sample in the fluoride solvent, and was performed for 5 minutes at 22° C.

3-2. Evaluation of Heating Loss

Each of the samples having the initial film thicknesses indicated in Table 1, fabricated by the method described above, was subjected to heating loss evaluations.

In these tests, each of the samples was left in 25° C., 100° C., 150° C., and 180° C. environments for 10 minutes each, and the film thickness was measured by FT-IR at each temperature. Samples were left for a further 20 minutes in the 180° C. environment (for a total of 30 minutes), the film thickness was measured, and samples of the prior art were compared with samples of this invention.

Figure 2:
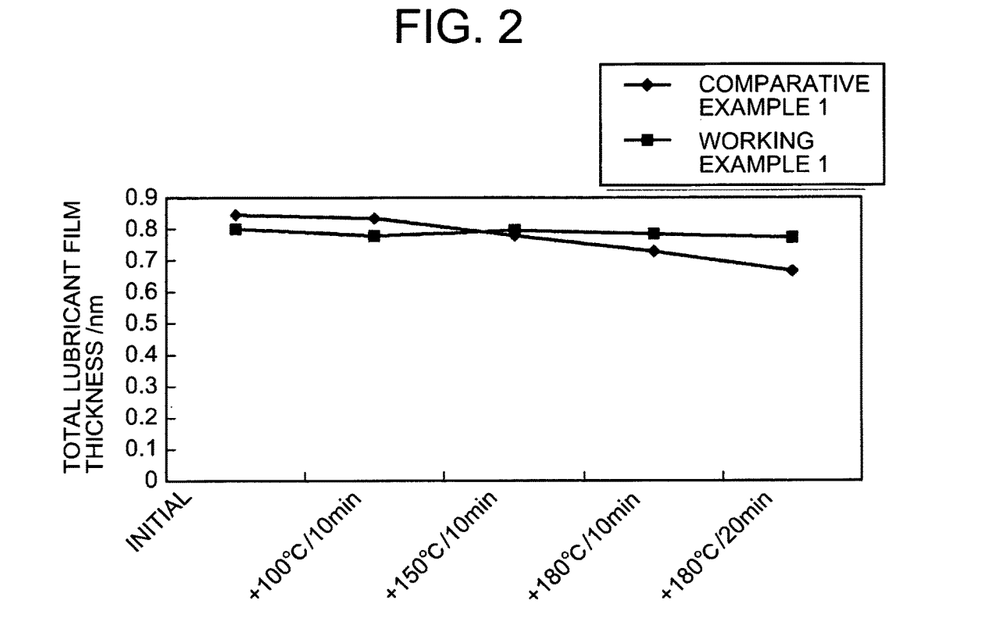
FIG. 2 shows comparison results of a magnetic recording medium of this invention and a magnetic recording medium of the prior art (lubricant layer thickness 0.8 nm) in heating loss evaluations; and, FIG. 3 shows comparison results of a magnetic recording medium of this invention and a magnetic recording medium of the prior art (lubricant layer thickness 1.2 nm) in heating loss evaluations.
Figure 3:
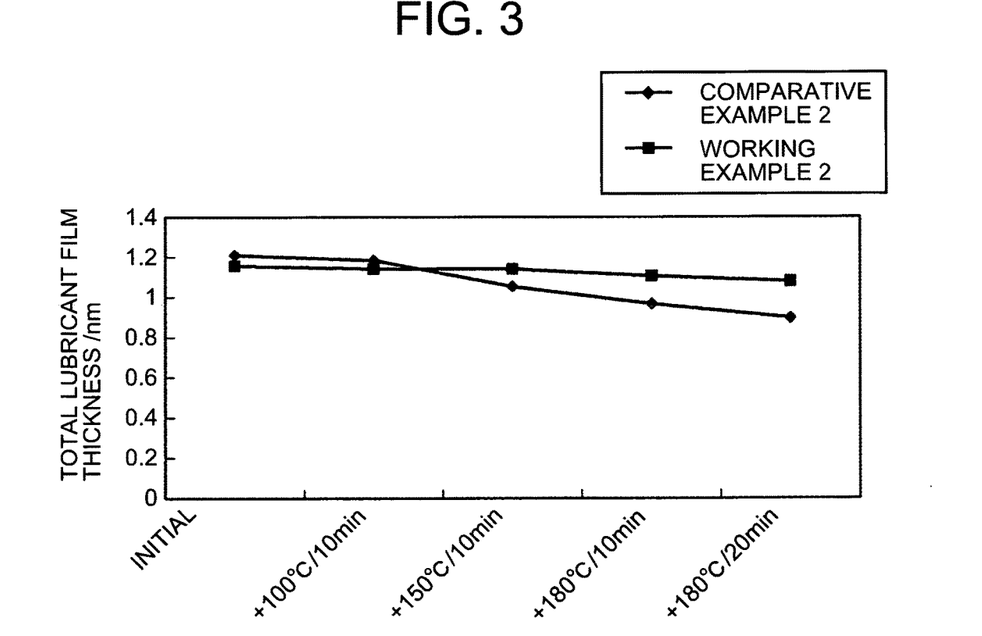

Comparison results for an initial film thickness of 0.8 nm (Working Example 1 and Comparative Example 1 in Table 1) are shown in FIG. 2, and comparison results for an initial film thickness of 1.2 nm (Working Example 2 and Comparative Example 2 in Table 1) are shown in FIG. 3.

From the results of FIG. 2 and FIG. 3, also in the lubricant applied to the magnetic disk, regardless of the total lubricant film thickness, there was little loss due to heating of lubricants of this invention, and it is seen that lubricant readily remains on the disk surface even in high-temperature environments.

Further, upon leaving samples for 30 minutes at 180° C., which is a temperature assumed to occur in thermally assisted recording methods, a loss of lubricant of approximately 23% was observed for conventional samples with lubricant layer film thicknesses of both 0.8 nm and 1.2 nm, whereas for samples of this invention the loss remained at 6.6% for a lubricant film thickness of 1.2 nm, and at 3.75% for 0.8 nm. From these results, it is seen that the lubricant of this invention had thermal resistance characteristics such that the amount of volatilization due to heating was less than 10% of the initial amount.

Hence by using a lubricant of this invention, a magnetic recording medium for thermally assisted recording can be realized in which the initial lubricant amount is maintained in environments at temperatures from 150° C. to 200° C.

Further, the characteristics of the lubricant are confirmed to be superior to lubricants of the prior art for lubricant molecular weights in the range from 500 to 10,000.

The invention claimed is:

1. In a magnetic recording medium for use in repeated thermally assisted recording including a nonmagnetic substrate on which are provided at least a magnetic layer, a protective layer, and a lubricant layer comprised of a lubricant, the improvement comprising:
providing, as the lubricant, a material that is effective for repeated thermally assisted recording at temperatures between 150° C. and 200° C., and that has a chemical formula represented by general formula (1), (2), or (3) as follows, $$R_1-(CF_2CF_2O)_p-(CF_2O)_q-R_2 \quad (1)$$

where p and q are mutually independent positive integers, $$F-(CF_2CF_2CF_2O)_r-R_3 \quad (2)$$

where r is a positive integer, and $$F-(CFCF_2O)_s-CFR_4 \quad (3)$$
$$\quad\ \ |\qquad\quad\ \ |$$
$$\ \ CF_3\qquad CF_3$$

where s is a positive integer,
wherein substituents $R_1$, $R_2$, $R_3$, and $R_4$ in terminal portions of the lubricant are organic groups, one of the substituents $R_1$ and $R_2$, as well as the substituents $R_3$ and $R_4$ consist of aliphatic or aromatic hydrocarbons or fluoride derivatives thereof, a plurality of functional groups, and one or more ether oxygen atoms,
wherein the aliphatic or aromatic hydrocarbons or fluoride derivatives thereof include from three to twelve carbon atoms, the plurality of functional groups are spaced apart by a distance of five atoms, and the plurality of functional groups are selected from among hydroxy groups, carboxyl groups, aldehyde groups, thiol groups, and sulfo groups,
wherein the lubricant has a molecular weight ranging between 500 and 10,000, and
wherein the lubricant layer has an amount of volatilization of less than 10% of an initial film thickness when the magnetic layer is heated to temperatures between 150° C. and 200° C. during repeated thermally assisted recording.

2. The magnetic recording medium according to claim 1, wherein the substituents $R_1$, $R_2$, $R_3$, and $R_4$ comprise one or more ether oxygen atoms.

3. In a magnetic recording medium for use in repeated thermally assisted recording including a nonmagnetic substrate on which are provided at least a magnetic layer, a protective layer, and a lubricant layer comprised of a lubricant, the improvement comprising:
providing, as the lubricant, a material that is effective for repeated thermally assisted recording at temperatures between 150° C. and 200° C., and that has a chemical formula represented by general formula (1), (2), or (3) as follows, $$R_1-(CF_2CF_2O)_p-(CF_2O)_q-R_2 \quad (1)$$

where p and q are mutually independent positive integers, $$F-(CF_2CF_2CF_2O)_r-R_3 \quad (2)$$

where r is a positive integer, and $$F-(CFCF_2O)_s-CFR_4 \quad (3)$$
$$\quad\ \ |\qquad\quad\ \ |$$
$$\ \ CF_3\qquad CF_3$$

where s is a positive integer,
wherein substituents $R_1$, $R_2$, $R_3$, and $R_4$ in terminal portions of the lubricant are organic groups, the substituents $R_1$ and $R_2$, as well as the substituents $R_3$ and $R_4$ consist of straight chain aliphatic hydrocarbons or fluoride derivatives thereof, a plurality of functional groups, and one or more ether oxygen atoms,
wherein the straight chain aliphatic hydrocarbons or fluoride derivatives thereof include from three to twelve carbon atoms, the plurality of functional groups are spaced apart by a shortest distance of three atoms or more, and the plurality of functional groups are selected from among hydroxy groups, carboxyl groups, aldehyde groups, nitro groups, nitrile groups, isonitrile groups, isocyanato groups, thiol groups, and sulfo groups,
wherein the lubricant has a molecular weight ranging between 500 and 10,000, and
wherein the lubricant layer has an amount of volatilization of less than 10% of an initial film thickness when the magnetic layer is heated to temperatures between 150° C. and 200° C. during repeated thermally assisted recording.

4. The magnetic recording medium according to claim 3, wherein the lubricant layer has an initial film thickness of 1.2 nm or less.

5. In a magnetic recording medium for use in repeated thermally assisted recording including a nonmagnetic substrate on which are provided at least a magnetic layer, a protective layer, and a lubricant layer comprised of a lubricant, the improvement comprising:
providing, as the lubricant, a material that is effective for repeated thermally assisted recording at temperatures between 150° C. and 200° C., and that has a chemical formula represented by general formula (1), (2), or (3) as follows, $$R_1-(CF_2CF_2O)_p-(CF_2O)_q-R_2 \quad (1)$$

where p and q are mutually independent positive integers, $$F-(CF_2CF_2CF_2O)_r-R_3 \quad (2)$$

where r is a positive integer, and $$F-(CFCF_2O)_s-CFR_4 \quad (3)$$
$$\quad\ \ |\qquad\quad\ \ |$$
$$\ \ CF_3\qquad CF_3$$

where s is a positive integer,
wherein substituents $R_1$, $R_2$, $R_3$, and $R_4$ in terminal portions of the lubricant are organic groups, the substituents $R_1$ and $R_2$, as well as the substituents $R_3$ and $R_4$ consist of straight chain aliphatic hydrocarbons or fluoride derivatives thereof, a plurality of functional groups, and one or more ether oxygen atoms, wherein the straight chain aliphatic hydrocarbons or fluoride derivatives thereof include from three to twelve carbon atoms, the plurality of functional groups are spaced apart by a distance of five atoms, and the plurality of functional groups are selected from among hydroxy groups, carboxyl groups, aldehyde groups, nitro groups, nitrile groups, isonitrile groups, isocyanato groups, thiol groups, and sulfo groups, wherein the lubricant has a molecular weight ranging between 500 and 10,000, and wherein the lubricant layer has an amount of volatilization of less than 10% of an initial film thickness when the magnetic layer is heated to temperatures between 150° C. and 200° C. during repeated thermally assisted recording.

6. The magnetic recording medium according to claim 3, wherein the substituents $R_1$, $R_2$, $R_3$, and $R_4$ comprise one or more ether oxygen atoms.

7. The magnetic recording medium according to claim 3, wherein the shortest distance between the functional groups is not more than five atoms.

8. In a magnetic recording medium including a nonmagnetic substrate on which are provided at least a magnetic layer, a protective layer, and a lubricant layer comprised of a lubricant, the improvement comprising:

providing, as the lubricant, a material that has a chemical formula represented by general formula (1), (2), or (3) as follows, $$R_1\text{—}(CF_2CF_2O)_p\text{—}(CF_2O)_q\text{—}R_2 \tag{1}$$

where p and q are mutually independent positive integers, $$F\text{—}(CF_2CF_2CF_2O)_r\text{—}R_3 \tag{2}$$

where r is a positive integer, and where s is a positive integer, wherein substituents $R_1$, $R_2$, $R_3$, and $R_4$ in terminal portions of the lubricant are organic groups, one of the substituents $R_1$ and $R_2$, as well as the substituents $R_3$ and $R_4$ consist of aliphatic or aromatic hydrocarbons or fluoride derivatives thereof, a plurality of functional groups, and one or more ether oxygen atoms, wherein the aliphatic hydrocarbons or fluoride derivatives thereof include from three to twelve carbon atoms, the plurality of functional groups are spaced apart by a distance of five atoms, and the plurality of functional groups are selected from among hydroxy groups, carboxyl groups, aldehyde groups, thiol groups, and sulfo groups, and wherein the lubricant has a molecular weight ranging between 500 and 10,000.

* * * * *